(12) United States Patent
Guo et al.

(10) Patent No.: US 12,045,585 B2
(45) Date of Patent: Jul. 23, 2024

(54) NO-CODING MACHINE LEARNING PIPELINE

(71) Applicant: Google LLC, Mountain View, CA (US)

(72) Inventors: Jiaqi Guo, Cupertino, CA (US); Pavel A. Dournov, Sammamish, WA (US)

(73) Assignee: GOOGLE LLC, Mountain View, CA (US)

( * ) Notice: Subject to any disclaimer, the term of this patent is extended or adjusted under 35 U.S.C. 154(b) by 206 days.

(21) Appl. No.: 16/549,675

(22) Filed: Aug. 23, 2019

(65) Prior Publication Data

US 2021/0055915 A1    Feb. 25, 2021

(51) Int. Cl.
*G06F 3/0482* (2013.01)
*G06F 8/34* (2018.01)
*G06F 9/451* (2018.01)
*G06N 20/00* (2019.01)

(52) U.S. Cl.
CPC .............. *G06F 8/34* (2013.01); *G06F 3/0482* (2013.01); *G06N 20/00* (2019.01)

(58) Field of Classification Search
CPC .............. G06F 8/34; G06F 8/35; G06N 20/00
See application file for complete search history.

(56) References Cited

U.S. PATENT DOCUMENTS

| | | | |
|---|---|---|---|
| 6,055,369 A | 4/2000 | Sawahata et al. | |
| 9,348,563 B1 * | 5/2016 | Xue | G06F 8/34 |
| 10,310,821 B2 * | 6/2019 | Brown | G06F 8/35 |
| 10,466,978 B1 * | 11/2019 | Vidan | G06N 7/01 |
| 2002/0026461 A1 * | 2/2002 | Kutay | G06F 40/154 |
| | | | 715/239 |
| 2002/0184610 A1 | 12/2002 | Chong et al. | |

(Continued)

FOREIGN PATENT DOCUMENTS

| | | |
|---|---|---|
| JP | 2004/070810 | 3/2004 |
| JP | 2015/167041 | 9/2015 |

OTHER PUBLICATIONS

Siracusa et al., "Techniques for Machine Language Model Creation" p. 1-39, U.S. Appl. No. 62/855,958 (Year: 2019).*
cloud.google.com [online], "Hosted AI repository with one-click deployment for machine learning teams," Jan. 2019, retrieved on Jan. 25, 2019, retrieved from URL <https://cloud.google.com/ai-hub/>, 4 pages.

(Continued)

*Primary Examiner* — S. Sough
*Assistant Examiner* — Mohammad H Kabir
(74) *Attorney, Agent, or Firm* — DORITY & MANNING P.A.

(57) ABSTRACT

Methods, and systems, including computer programs encoded on computer storage media for generating machine learning models. A method includes receiving, through a GUI, user selection of a mode button displayed in the GUI, wherein the mode button, when selected, causes the GUI to display a first set of user-selectable buttons that correspond to respective machine learning routines, and when not selected, causes the GUI to display a second set of user-selectable buttons that correspond to respective machine learning sub-routines; in response to receiving user selection of the mode button, displaying the first set of user-selectable buttons; receiving user selection of one or more of the first set of user-selectable buttons; displaying a graphical representation of a machine learning model defined by machine learning routines corresponding to the user selected one or more of the first set of user-selectable buttons and generating a file representing the machine learning model.

20 Claims, 6 Drawing Sheets

(56) References Cited

U.S. PATENT DOCUMENTS

| | | | |
|---|---|---|---|
| 2011/0249002 A1* | 10/2011 | Duplessis | G06T 11/206 345/440 |
| 2014/0032606 A1* | 1/2014 | Chandler | G06F 8/34 707/798 |
| 2014/0359558 A1* | 12/2014 | Chamberlain | G06F 8/35 717/105 |
| 2015/0205496 A1* | 7/2015 | Lord | G16H 20/17 715/746 |
| 2016/0170720 A1 | 5/2016 | Xue et al. | |
| 2017/0102678 A1 | 4/2017 | Nixon et al. | |
| 2017/0351511 A1* | 12/2017 | Bar-Or | G06F 8/34 |
| 2018/0268258 A1* | 9/2018 | Tapia | G06K 9/6262 |
| 2018/0349103 A1* | 12/2018 | Brown | G06N 20/00 |
| 2019/0303107 A1* | 10/2019 | Kelly | G06F 9/453 |
| 2020/0019882 A1* | 1/2020 | Garg | G06F 3/0484 |
| 2020/0193221 A1* | 6/2020 | Aftab | G06N 3/08 |
| 2020/0293940 A1* | 9/2020 | Chopra | G06F 8/34 |
| 2020/0379609 A1* | 12/2020 | Jacob | G06F 9/453 |
| 2020/0380301 A1* | 12/2020 | Siracusa | G06N 20/00 |

OTHER PUBLICATIONS

International Search Report and Written Opinion for the related Application No. PCT/US2020/047068, Dated Nov. 24, 2020, 19 pages.

Anonymous : "Deep Learning made easy with 1-20, Deep Learning Studio—Complete Guide", May 22, 2018 (May 22, 2018), Retrieved from the Internet: URL:https://mc.ai /deep-learning-made-easy-with-deep-learning-studio-complete-guide/ [retrieved on Nov. 10, 2020] p. 4, p. 14, p. 18, p. 29.

Bart, Austin Cory et al : "Design and Evaluation of a Block-based Environment with a Data Science Context" , IEEE Transactions on Emerging Topics in Computing, IEEE, USA, vol. 8, No. 1, Jul. 20, 2017 (Jul. 20, 2017), pp. 182-192, DOI: 10.1109/TETC.2017. 2729585 [retrieved on Mar. 3, 2020] abstract sections III and IV; p. 184-p. 187; figures 1, 2.

Favio Vazquez: "Towards an Easier Deep Learning Life with Deep Cognition", Sep. 5, 2018 (Sep. 5, 2018), Retrieved from the Internet: URL:https://mc.ai /towards-an-easier-deep-Learning-life-with-deep-cognition/ [retrieved on Nov. 10, 2020] p. 3.

* cited by examiner

NO-CODING MACHINE LEARNING PIPELINE

BACKGROUND

This specification relates to cloud computing.

Cloud computing systems can provide access to various computing resources. For example, a cloud computing system may store data for a client device which may be accessible by multiple different devices, allow multiple different client devices to access a single application executing on the cloud, and provide access to other computer resources.

SUMMARY

This specification describes a cloud computing no-coding machine learning pipeline for building, executing and publishing machine learning models.

In general, one innovative aspect of the subject matter described in this specification can be implemented in a computer implemented method that includes providing a graphical user interface (GUI) for generating machine learning models; receiving, through the GUI, user selection of a mode button displayed in the GUI, wherein the mode button, when selected, causes the GUI to display a first set of user selectable buttons that correspond to respective machine learning routines, and when not selected, causes the GUI to display a second set of user selectable buttons that correspond to respective machine learning sub-routines, wherein a machine learning routine comprises a respective plurality of connected machine learning sub-routines; in response to receiving the user selection of the mode button, displaying, in the GUI, the first set of user selectable buttons; receiving, through the GUI, user selection of one or more of the first set of user selectable buttons; displaying, in the GUI, a graphical representation of a machine learning model that is defined by one or more machine learning routines corresponding to the user selected one or more of the first set of user selectable buttons and generating a file representing the machine learning model.

Other implementations of these aspects include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the machine learning sub-routines comprise data formatting algorithms; data splitting algorithms; feature selection algorithms; machine learning training algorithms, machine learning evaluation algorithms, or statistical algorithms.

In some implementations each of the user selectable buttons in the first set of user selectable buttons represents a wrapped file corresponding to a machine learning routine and comprising a respective plurality of connected machine learning sub-routines.

In some implementations the method further comprises receiving, through the GUI, user selection of a source code button displayed in the GUI; in response to receiving the user selection of the source code button, displaying, in the GUI, source code representing the machine learning model, wherein the generated file comprises the source code; receiving, through the GUI, one or more user adjustments to the displayed source code; and generating an updated file representing an updated machine learning model that is defined by (i) the one or more machine learning routines corresponding to the user selected one or more of the first set of user selectable buttons, and (ii) the adjustments to the displayed source code.

In some implementations adjustments to the displayed source code comprise adjustments to machine learning model parameters or functions included in the source code.

In some implementations the method further comprises receiving, through the GUI and from the user, a request to download the generated file representing the machine learning model; and providing, through the GUI, access to the generated file representing the machine learning model.

In some implementations the request to download the generated file representing a machine learning model comprises a request to reformat the generated file according to an indicated type, and wherein the method further comprises: generating a reformatted file representing the machine learning model of the indicated type; and providing, through the GUI, access to the reformatted file representing the machine learning model.

In some implementations the method further comprises storing the generated file representing the machine learning model at a location associated with the user.

In some implementations the method further comprises receiving, through the GUI, selection of a dataset; receiving, through the GUI, a request to execute the generated file representing the machine learning model using the dataset; executing the generated file representing the machine learning model using the dataset to generate a respective machine learning model output; and providing the generated machine learning model output for display in the GUI.

In some implementations receiving selection of a dataset comprises receiving a selection of a sample dataset or receiving selection of a dataset imported by the user.

In some implementations receiving, through the GUI, a request to execute the generated file representing the machine learning model using the dataset comprises receiving, through the GUI, user selection of a run button, wherein the run button is enabled for selection when a machine learning model input dataset is selected.

In some implementations the method further comprises receiving a request to publish the generated file representing the machine learning model; and in response to receiving the request, publishing the generated file as a new asset in the GUI.

In some implementations the provided GUI for generating machine learning models comprises a drag and drop interface, wherein the GUI comprises: a searchable list of the first set or second set of user selectable buttons; and an editing area; wherein a user can select, drag and drop user selectable buttons from the first set of user selectable buttons or the second set of user selectable buttons into the editing area to define a machine learning model.

In some implementations frequently used types of machine learning sub-routines or machine learning routines are listed higher than less frequently used machine learning sub-routines or machine learning routines.

In some implementations the editing area comprises a template graph to assist a user when selecting, dragging and dropping user selectable buttons into the editing area to define a machine learning model.

In some implementations the provided GUI for generating machine learning models comprises multiple user selectable tabs, comprising a machine learning model creation tab, a machine learning model publish tab, and a machine learning model version tab.

The subject matter described in this specification can be implemented in particular ways so as to realize one or more of the following advantages.

A system implementing the no-coding machine learning pipeline described in this specification provides users that cannot code, or do not want to code, the possibility to quickly and easily generate, execute and publish machine learning models. In addition, through the presently described easy mode functionality, users of the no-coding machine learning pipeline do not need to have an understanding of basic or complex machine learning concepts. The presently described no-coding machine learning pipeline is therefore accessible to a larger number of users and improves interactions between users and the pipeline, since even inexperienced users can generate and run machine learning solutions quickly and with minimal effort.

In addition, a system implementing the no-coding machine learning pipeline described in this specification provides a user with increased flexibility, since the frontend of the pipeline provides the possibility to directly modify source code underlying a generated machine learning model. A user can more quickly generate a machine learning model using the provided easy mode, but can also achieve increased control over the machine learning model. In addition, machine learning models or building blocks of machine learning models built by different users are easily reused. Therefore, the efficiency at which personalized models can be generated is improved. Furthermore, the computational efficiency of running a machine learning model can be improved, since users with experience of machine learning concepts have the possibility to streamline a provided machine learning routine.

A system implementing the no-coding machine learning pipeline described in this specification provides users with increased transparency of execution and data security, since a machine learning model generated by the no-coding machine learning pipeline can be executed on resources provisioned for the user in the system or can be downloaded and run securely offline.

In addition, a system implementing the no-coding machine learning pipeline described in this specification provides a type safety check at design time, since when an output of a block does not match the input of another, a user cannot connect the building blocks. Therefore, errors can be identified or prevented during the build process and not only at run time.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Machine learning is the study of algorithms and statistical models that computer systems use to effectively perform a specific task without using explicit instructions, relying on patterns and inference instead. Machine learning algorithms build models of training data in order to make predictions or decisions on unseen data without being explicitly programmed to perform the specific task.

This specification describes a cloud computing service for building machine learning models. The service includes a GUI, e.g., a web-based GUI, where users can drag and drop graphical representations of machine learning sub-routines into an editing area. Users can link dropped machine learning sub-routines to form a graph that represents a machine learning model.

To assist a user with little understanding of the concepts of machine learning, the GUI provides an easy mode presentation where machine learning sub-routines are wrapped to form "black box" representations of complete machine learning routines that require only a data input and a target output to be specified. Users can then drag and drop graphical representations of these machine learning routines into the editing area to form a graph that represents a machine learning model.

The cloud service can provide access to a machine learning engine where the generated machine learning model can be trained and/or used for inference. Alternatively, a user can download a file representing the generated machine learning model and train and/or perform inference offline, e.g., on open source stacks.

Example Operating Environment

Figure 1:
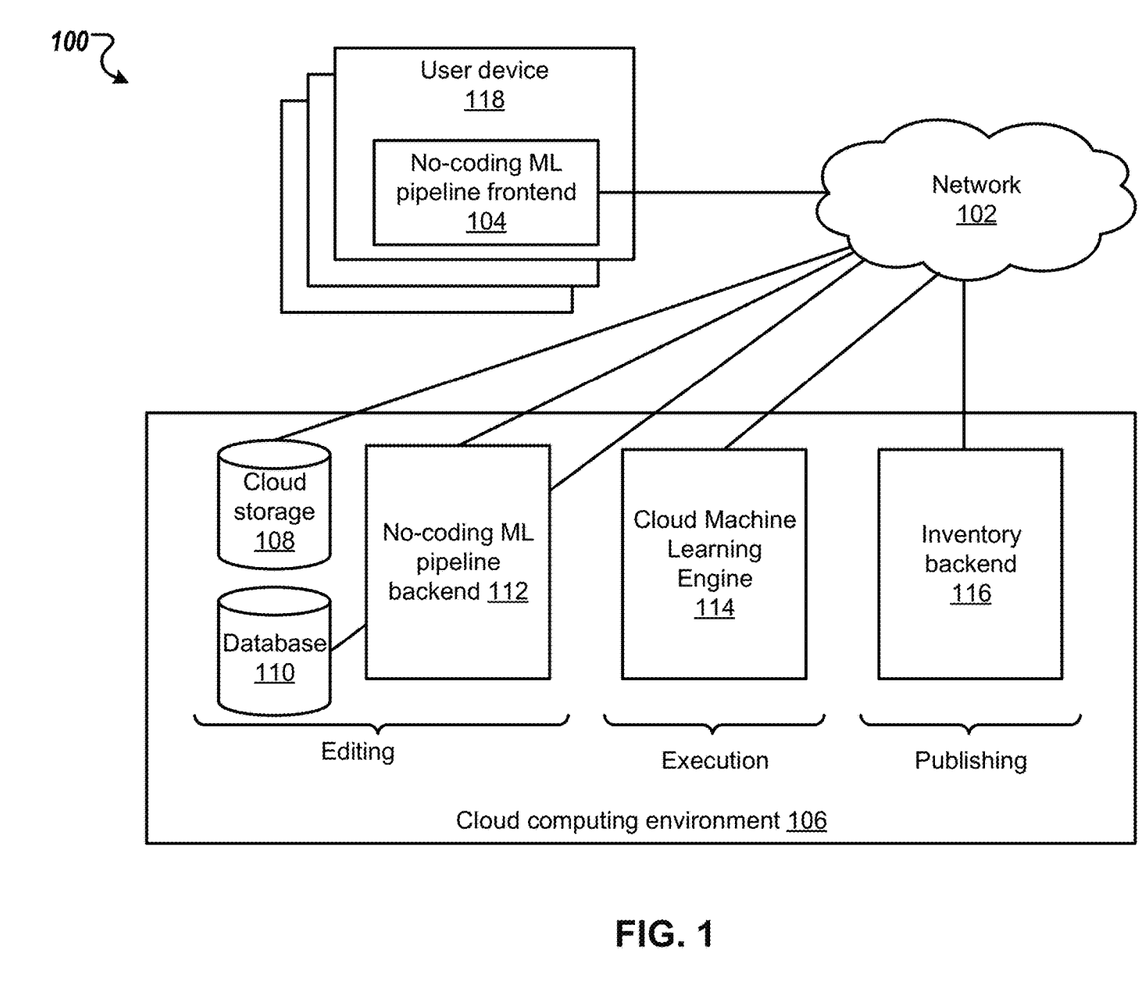
FIG. 1 is a block diagram of an example system in which a no-coding machine learning pipeline is implemented.

FIG. 1 is a block diagram of an example system 100 in which a no-coding machine learning pipeline is implemented. A computer network 102 such as a local area network (LAN), wide area network (WAN), the Internet, or a combination thereof, connects a no-coding machine learning pipeline frontend 104 to various components of a cloud computing environment 106.

A user can access the no-coding machine learning pipeline frontend 104 via a user device, e.g., user device 118. The user device 118 may include a computing device, such as a desktop computer, a laptop computer, a tablet computer, a smart phone, or any device capable of displaying a graphical user interface (GUI) of the no-coding machine learning pipeline frontend provided by the no-coding machine learning pipeline backend 112.

The GUI provided by the no-coding machine learning pipeline backend 112 may be a web-based GUI and provides users with an interactive, visual workspace to build, execute, and publish machine learning models. The GUI allows users to drag and drop machine learning sub-routines into an editing area where they may be connected to form a machine learning model—users do not require programming skills to generate the machine learning model. A formed machine learning model can be trained on a dataset by the cloud computing environment 106, or can be downloaded and trained offline by a third party system. Similarly, once trained, the cloud computing environment 106 can use the machine learning model to perform inference on a dataset, or a third party system can download the trained machine learning model and perform inference using the trained machine learning model. Example GUIs provided by the no-coding machine learning pipeline backend are illustrated and described below with reference to FIGS. 2 and 4. An example process for generating a machine learning model using a no-coding machine learning pipeline is described below with reference to FIGS. 5, 6A and 6B.

The various components of the cloud computing environment 106 include a cloud storage component 108, a relational or non-relational database 110, e.g., a newSQL database, a no-coding machine learning pipeline backend 112, a cloud machine learning engine 114, and an inventory backend 116.

The cloud storage component 108, a relational or non-relational database 110, e.g., a newSQL database, a no-coding machine learning pipeline backend 112 are components that perform operations relating to generating or editing a machine learning model based on input received from a user via the no-coding machine learning pipeline frontend. The no-coding machine learning pipeline backend provides the GUI described above, and processes inputs received via the GUI from the user. Example operations performed by the no-coding machine learning pipeline backend include some or all of those described below with reference to FIGS. 5, 6A and 6B. The cloud storage component 108 and database 110 store information relating to a machine learning models created by a user through the no-coding machine learning pipeline frontend. For example, the cloud storage component 108 and database 110 may store intermediate states, a revision history, execution logs, or inputs/outputs of a machine learning model.

The cloud machine learning engine 114 performs operations relating to executing a machine learning model generated by the no-coding machine learning pipeline frontend and backend. For example, the cloud machine learning engine 114 can execute machine learning routines or sub-routines in a machine learning model on specified datasets to train the machine learning model and/or to perform inference. Outputs (results) generated by the cloud machine learning engine 114 can be provided directly to the no-coding machine learning pipeline frontend 104 or to the no-coding machine learning pipeline backend 112.

The inventory backend 116 performs operations relating to publishing a machine learning model generated by the no-coding machine learning pipeline frontend and backend. For example, the inventory backend may include storage (with security checks) that is public to users of the no-coding ML pipeline.

Figure 2:
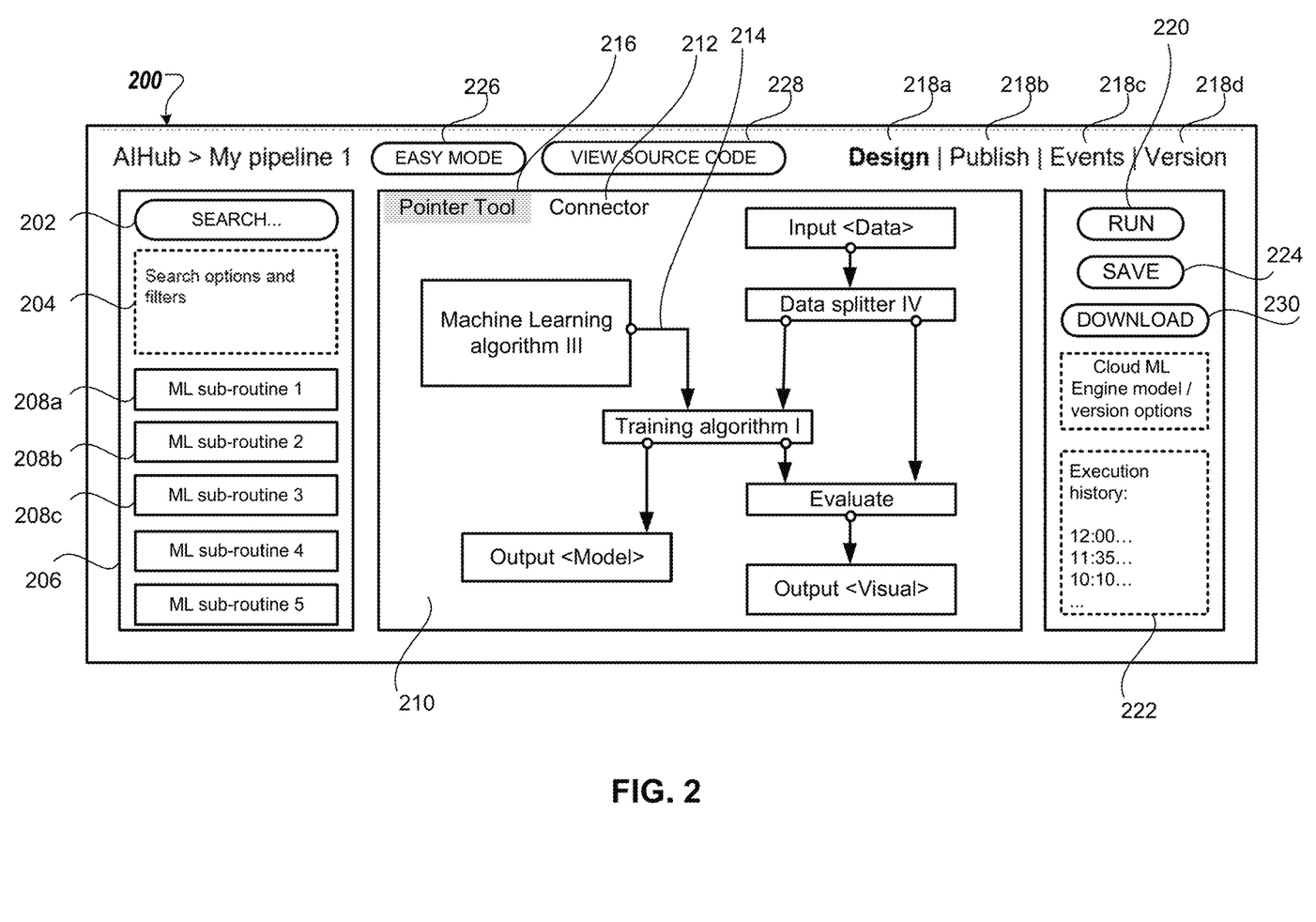
FIG. 2 is an illustration of an example graphical user interface for generating, executing and publishing machine learning models using a no-coding machine learning pipeline.

FIG. 2 is an illustration of an example GUI 200 for generating, executing and publishing machine learning models using a no-coding machine learning pipeline.

The example GUI 200 includes a search box 202 where users can search a list of machine learning sub-routines. Example machine learning sub-routines can include algorithms or functions such as: various data formatting algorithms; various data splitting algorithms; various feature selection algorithms; various machine learning training algorithms, various machine learning evaluation algorithms, or various statistical algorithms. Other example machine learning sub-routines include data sets or machine learning commands such as input, output, or evaluate. In some implementations the GUI 200 may also include an area 204 where search options and filters can be set by the user. For example, a user may select a type of machine learning task as a search option.

In some implementations, prior to a user entering text into the search box 202, a default list of machine learning sub-routines in box 206 can be displayed in the GUI, e.g., a list of frequently used machine learning sub-routines where more frequently used machine learning sub-routines are listed higher than less frequently used machine learning sub-routines. In addition, after a user begins to enter text into the search box 202, the list of displayed machine learning sub-routines in box 206 can be updated based on the entered text.

Each machine learning sub-routine in the list of machine learning sub-routines 206 is displayed as a user selectable button, e.g., user selectable buttons 208a-c. By selecting the pointer tool button 216 to activate a pointer tool functionality, a user can select a button corresponding to a particular machine learning sub-routine and drag and drop the button corresponding to the particular machine learning sub-routine into the editing area 210. In the example GUI 200, a user has selected, dragged and dropped buttons corresponding to the machine learning sub-routines "Input <Data>," "Machine learning algorithm III," "Data splitter IV," "Training algorithm I," "Evaluate," and "Output <Model>, Output <Visual>."

The editing area 210 is used to define a machine learning model based on the selected machine learning sub-routines. Once the user drops buttons corresponding to machine learning sub-routines into the editing area 210, the user can further connect the machine learning sub-routines to form a graph that represents a machine learning model. Connections between machine learning sub-routines, e.g., connection 214, can be created by selecting the connector button 212 to activate a connector functionality. In some implementations the connector functionality may not allow for connections between incompatible machine learning sub-routines, e.g., may not allow a user to connect an input sub-routine directly to an output sub-routine, and may automatically direct connections between connected machine learning sub-routines, e.g., may connect a data splitting routine to a training algorithm, even if a user first selects the training algorithm then selects the data splitting routine. These aspects of the connector functionality can increase the likelihood that a generated machine learning model is functional and can be executed without error.

In some implementations the editing area 210 may display a template graph to assist a user when selecting, dragging and dropping user selectable buttons corresponding to machine learning sub-routines into the editing area to define a machine learning model. For example, a template graph showing connected building blocks of an exemplary machine learning model in a 50% opacity may be shown in the editing area when the GUI is first presented to the user. In some implementations the template graph presented in the editing area may be updated based on a search term or search option input by the user in search box 202 or area 204. For example, if a user enters "image classification" into area 204, the template graph displayed in editing area 210 may show an example graph of multiple connected machine learning sub-routines that together represent a convolutional neural network.

As a user operates in the editing area, i.e., drags, drops and connects machine learning sub-routines in the editing area, the system providing the GUI calls a backend with a proto file that represents the graph under construction. In some implementations the system can store a complete or partial history of operations performed in the editing area.

The example GUI 200 further includes multiple user selectable tabs, e.g., a machine learning model creation or design tab 218a, a machine learning model publish tab 218b, an events tab 218c and a machine learning model version tab 218d. If a user selects the design tab 218a, the GUI presentation includes options and features for creating a machine learning model, as shown in example GUI 200.

If a user selects the publish tab 218b, the GUI presentation may alternatively or in addition present options and/or features relating to publishing a created machine learning model. For example, the GUI presentation may include a user selectable publish button that, when selected, allows the system to publish the graph as an asset for other users of the system to edit, execute and save. Such published assets may be accessible to users under the design tab 218a, e.g., presented in the list in box 206.

If a user selects the events tab 218c, the GUI presentation may present a page that lists an activity log of a particular project, where a user can view timestamps and each revision of the machine learning model, e.g., corresponding to a user executing one or more steps of the model or storing files in the cloud. The events tab 218c can also serve as a summary of costs incurred by a user of the cloud service, since the timestamps and revisions can match to respective charges that appear in a user's bill.

If a user selects the version tab 218d, the GUI presentation may include a history of edits made in the editing area, e.g., presented as a list of selectable snapshots. A user can restore a snapshot by selecting the snapshot, which can automatically copy the snapshot into a new project or pipeline, e.g., a second GUI presentation. In some implementations a user may also view a summary of an execution history when operating the GUI under the design tab, e.g., in area 222 of GUI 200.

The example GUI 200 further includes a run button 220. When the run button is enabled, a user can select the run button to execute a machine learning model generated in the editing area 210. When the run button is selected, the machine learning model is immediately executed in the cloud, e.g., by the cloud machine learning engine. Results from selecting the run button 220 and executing the machine learning model can be directly displayed in the editing area, or can be seen by hovering over or selecting corresponding output module in the editing area. However, in some implementations the run button 220 may be disabled, e.g., if the generated machine learning model in the editing area is missing a routine or otherwise cannot be executed. In these implementations the GUI may also present a warning sign, e.g., in the editing area 210 or next to the run button 220.

The example GUI 200 further includes a save button 224 and a download button 230. A user can select the save button 224 to locally save the machine learning model generated in the editing area, e.g., to the cloud. Alternatively or in addition, a user can select the download button 230 to download a file representing the machine learning model generated in the editing area 210. The download button 230 may be selected before the run button 220 is selected, i.e., before the machine learning model is trained and/or evaluated, or can be selected after the run button 220 is selected, e.g., to download a trained machine learning model. Executing and saving machine learning models generated using a GUI for generating machine learning models is described in more detail below with reference to FIGS. 6A and 6B.

The example GUI further includes a view source code button 228. A user can select the view source code button to view source code corresponding to the machine learning model presented in the editing area 210. For example, in response to selecting the view source code button the GUI may split the editing area into two sections where the machine learning model is presented in one section and the corresponding source code in the other section. Alternatively, the source code may be presented in another part of the GUI.

Displaying source code that represents the machine learning model enables a user to adjust the machine learning model. For example, a user with some experience in machine learning may be able to identify adjustments that will streamline the machine learning model, e.g., reduce the training time required by the machine learning model and/or reduce inference time, without compromising on solution accuracy. Such adjustments could include adjusting a number of neural network layers used by a particular machine learning sub-routine or routine, or specifying a different activation function. As another example, a user with some experience in machine learning may wish to compare multiple machine learning models and their effectiveness in solving a particular task on a particular dataset. Manually adjusting the source code behind a machine learning model therefore provides increased personalization, and can enable a user to generate a machine learning model that is increasingly suited to the particular task.

In some implementations, hovering or pointing over a portion of the machine learning model may cause the GUI to highlight or otherwise indicate relevant portions of displayed source code. This can assist a user and improve the accuracy of adjustments made to the source code.

The example GUI 200 further includes an easy mode button 226. A user can select the easy mode button 226 to change the presentation of the GUI 200. For example, selecting the easy mode button 226 may change the displayed list 206 of machine learning sub-routines. Instead of displaying only user selectable buttons corresponding to machine learning sub-routines, user selectable buttons corresponding to one or more machine learning routines can be displayed. In this context, a machine learning routine is a process that accepts input data, processes the data according to a sequence of one or more machine learning sub-routines, and outputs an evaluation result. The machine learning routine can represent a machine learning algorithm building block, or an entire machine learning algorithm. In either case the machine learning routine appears as a black box to the user—the user does not need to build the machine learning routine themselves from multiple machine learning sub-routines. Therefore, the user does not need to understand machine learning concepts or how to transform or split data. By selecting the easy mode button 226, the presented GUI can be operated by a larger number of users—those with experience in machine learning and those without.

For convenience, the example machine learning routines described in this specification represent entire machine learning algorithms. However, as described above, the machine learning routines represented by the user selectable buttons displayed in easy mode can represent building blocks of a machine learning algorithm. In these cases, the user can have the flexibility of using one machine learning routine in easy mode and another routine in advanced or "normal" mode.

Each user selectable button that corresponds to a machine learning routine may represent a wrapped file that includes multiple connected machine learning sub-routines that define the machine learning routine. For example, a wrapped file representing a machine learning routine may include one or more of a (i) data transformation algorithm, (ii) machine learning training algorithm, or (iii) machine learning evaluation algorithm. The wrapping of the multiple machine learning sub-routines can be performed by a standard wrapper.

Figure 3:
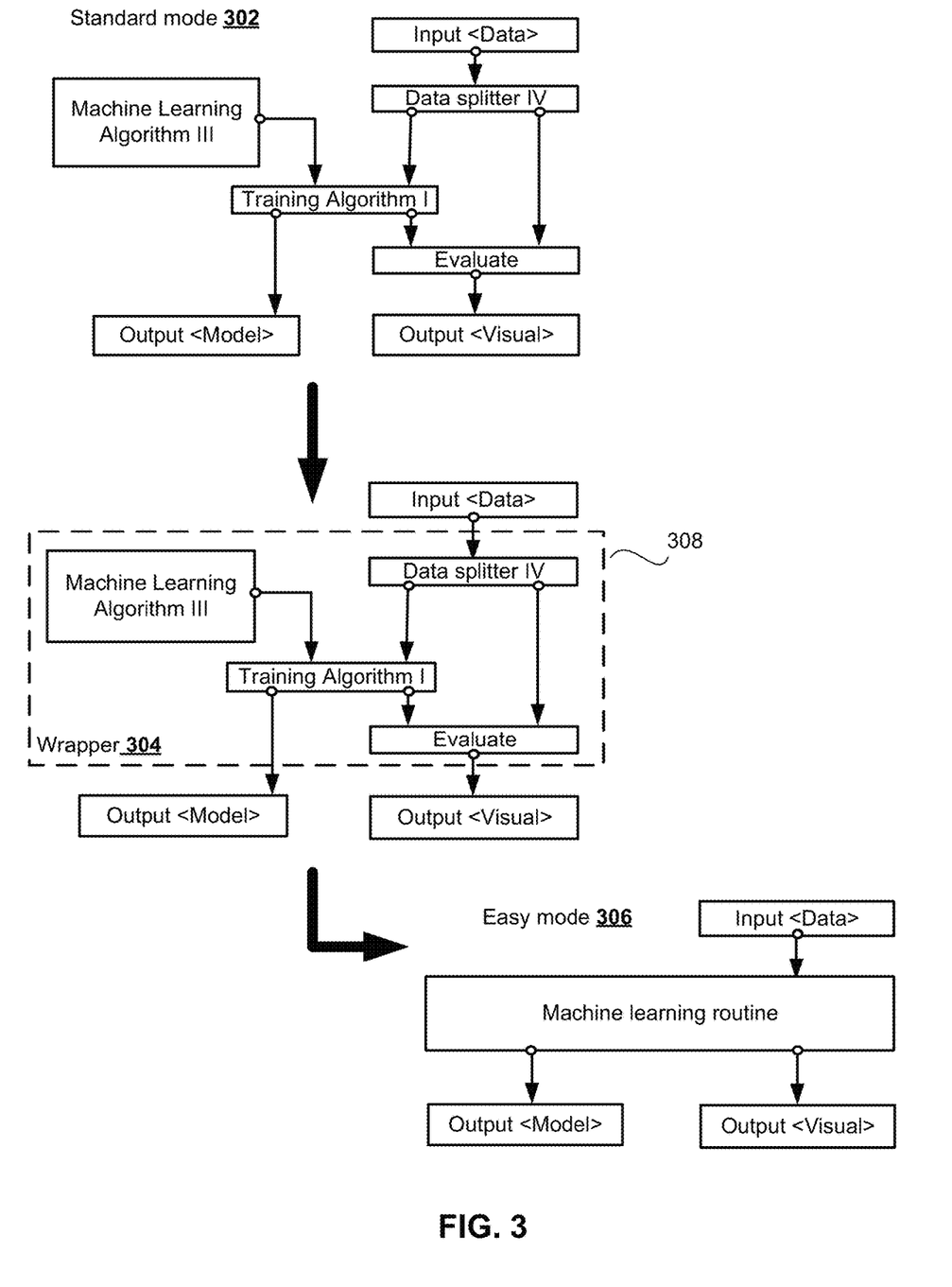
FIG. 3 is an illustration of a wrapped file representing an example machine learning routine.

FIG. 3 is an illustration of an example wrapped file. For convenience, FIG. 3 shows an example wrapping of the example machine learning model defined by a user in editing area 210 in GUI 200 of FIG. 2.

In the standard mode 302, the example machine learning model includes a specific data splitting routine (data splitting module IV), a training algorithm (training algorithm I), a machine learning algorithm (machine learning algorithm III) and an evaluation routine. Together, this configuration of sub-routines represents a corresponding machine learning routine.

The configuration of machine learning sub-routines shown in standard mode 302 can be wrapped using a sub-routine wrapper 304, as shown by the dotted lines 308. This wrapping generates the easy mode "black box" presentation 306. The easy mode presentation 306 corresponds to the same machine learning model defined by the user when operating the GUI in the standard mode 302. That is, the system generates a same file/source code representing the machine learning model, independent of whether the user operates the GUI in standard mode or easy mode.

Figure 4:
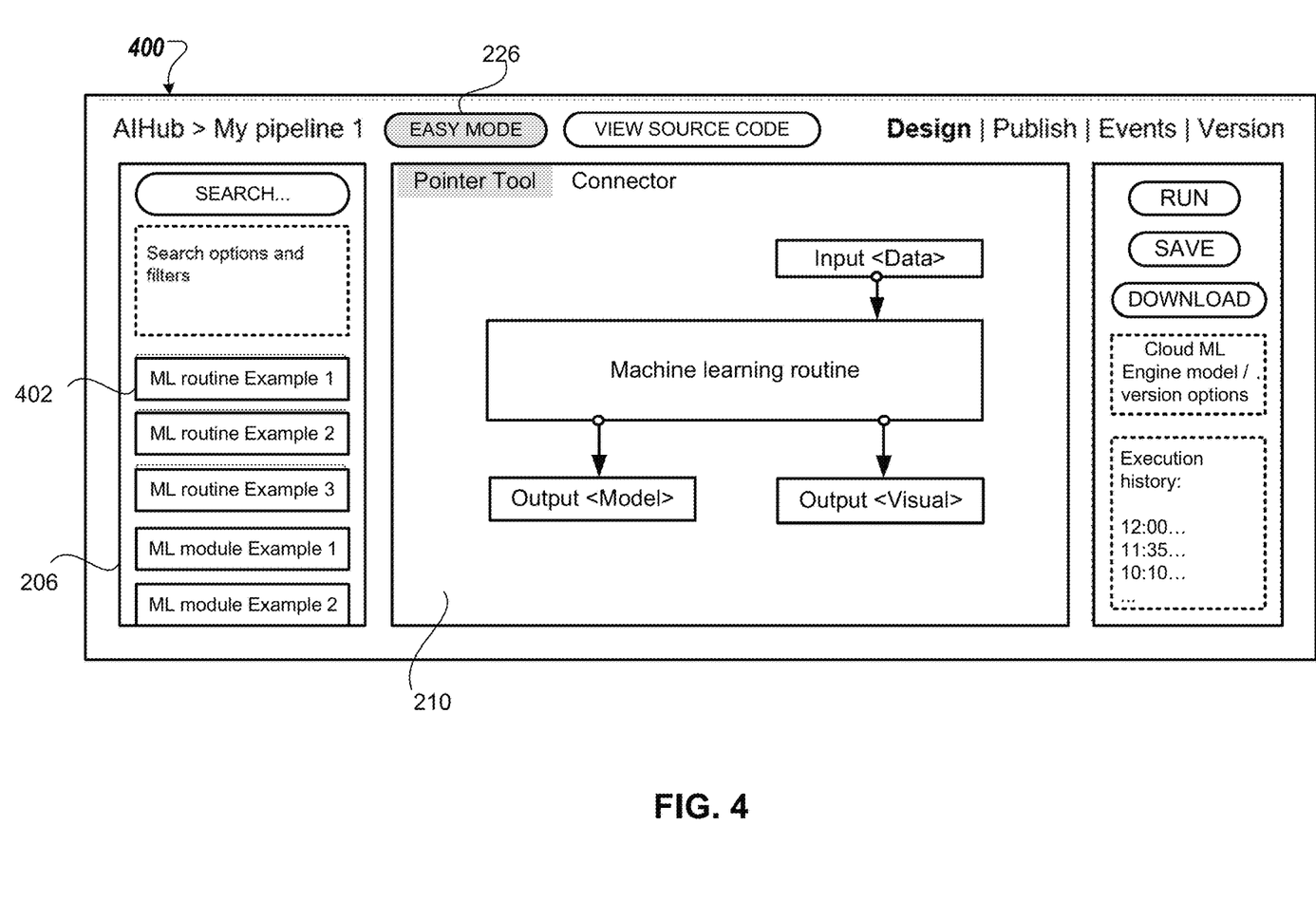
FIG. 4 is an illustration of an example graphical user interface for generating, executing and publishing machine learning models using an easy mode functionality in a no-coding machine learning pipeline.

FIG. 4 is an illustration of an example graphical user interface 400 for generating, executing and publishing machine learning models using an easy mode functionality. The example GUI 400 builds on the example GUI 200 of FIG. 2. In particular, FIG. 4 illustrates the differences in the GUI presentation after a user selects the easy mode button 226.

For example, after the easy mode button 226 is selected, the presented list of user selectable buttons representing the multiple machine learning sub-routines in box 206 is replaced with an easy mode list. The easy mode list includes at least one user selectable button, e.g., user selectable button 402, that represents a machine learning routine, i.e., a wrapped file that contains one or more machine learning sub-routines. In some implementations the easy mode list may include user selectable buttons corresponding to both machine learning sub-routines and machine learning routines. In other implementations the easy mode list may include only user selectable buttons that correspond to machine learning routines. As described above with reference to FIG. 2, a user can drag and drop buttons corresponding to machine learning routines into the editing area 210 to generate a machine learning model.

Programming the Hardware: Editing Experience

Figure 5:
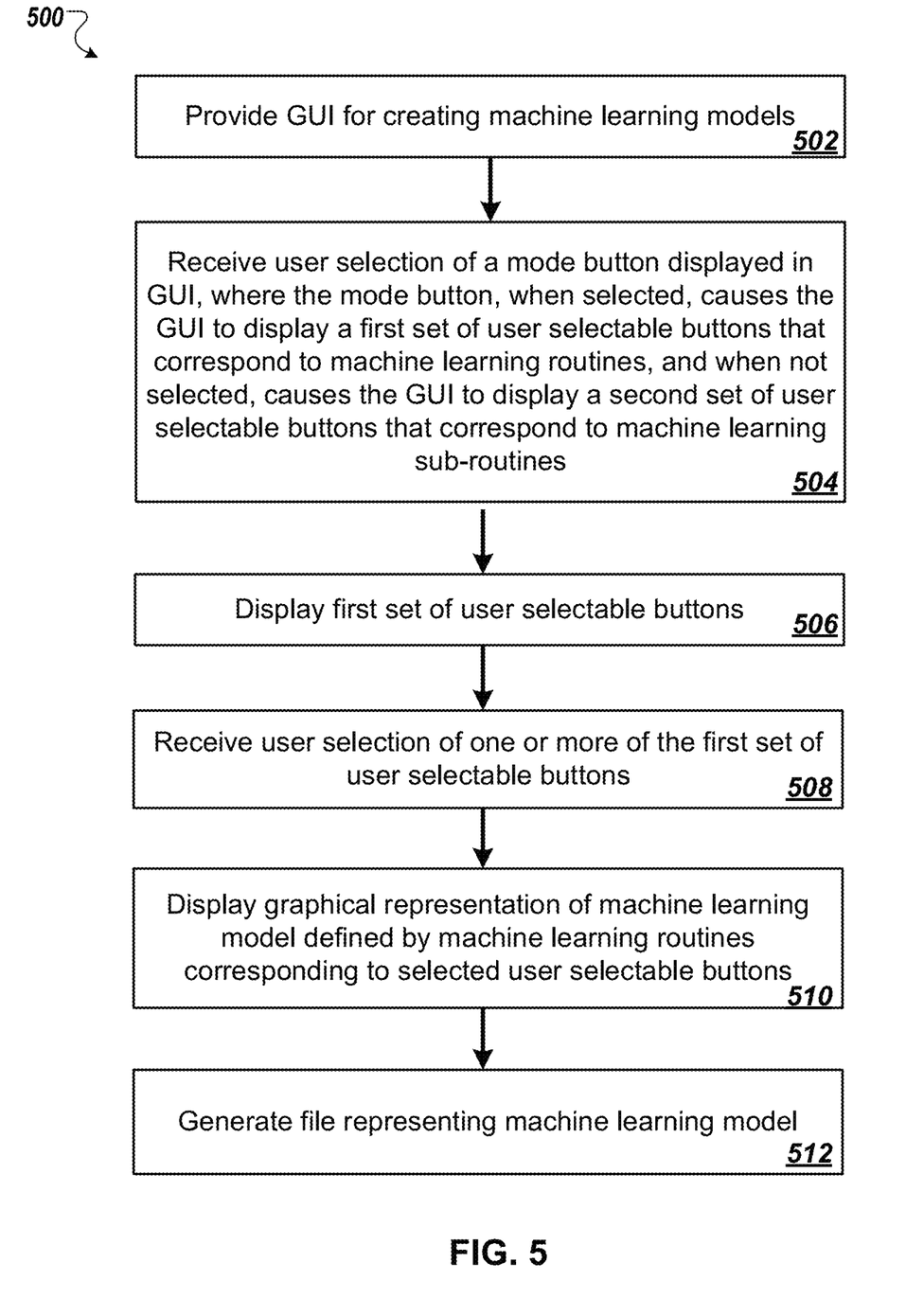
FIG. 5 is a flow diagram of an example process for generating a machine learning model using a no-coding machine learning pipeline.

FIG. 5 is a flow diagram of an example process 500 for generating a machine learning model using a no-coding machine learning pipeline. For convenience, the process 500 will be described as being performed by a system of one or more computers located in one or more locations. For example, the system 100 of FIG. 1, appropriately programmed in accordance with this specification, can perform the process 500.

The system provides a graphical user interface (GUI) for generating machine learning models (step 502). For example, the system may provide the GUI 200 described above with reference to FIG. 2. In some implementations the GUI may be a web-based GUI, and providing the GUI may include providing the GUI through a web browser.

The system receives, through the provided GUI, user selection of a mode button displayed in the GUI (step 504). The mode button is a button that, when selected, causes the GUI to display a first set of user selectable buttons that correspond to respective machine learning routines. When the mode button is not selected, the GUI displays a second set of user selectable buttons that correspond to respective machine learning sub-routines, wherein a machine learning routine comprises a respective plurality of connected machine learning sub-routines. For example, the mode button may correspond to the easy mode button described above with reference to FIGS. 2-4.

In some implementations, the machine learning routines include multiple machine learning sub-routines, and correspond to respective wrapped files. Each wrapped file can include one or more machine learning sub-routines, e.g., one or more of a (i) data transformation algorithm, (ii) machine learning training algorithm, or (iii) machine learning evaluation algorithm.

In response to receiving the user selection of the easy mode button, the system displays, in the GUI, the first set of user selectable buttons (step 506). An example GUI presentation after selection of a mode button is illustrated with reference to FIG. 4.

The system receives, through the GUI, user selection of one or more of the first set of user selectable buttons (step 508). The system displays, in the GUI, a graphical representation of a machine learning model that is defined by one or more machine learning routines corresponding to the user selected one or more of the first set of user selectable buttons (step 510). An example graphical representation is illustrated in the editing area of the example GUI 400 of FIG. 4. The system generates a file representing the machine learning model (step 512).

In some implementations the system may further receive, through the GUI, user selection of a source code button displayed in the GUI. In response to receiving the user selection of the source code button, the system may display, in the GUI, source code representing the machine learning model that is defined by the received user selection of one or more of the multiple user selectable buttons (e.g., source code included in the file generated at step 510). In some implementations, when a user hovers over selected buttons that correspond to respective types of machine learning algorithms, corresponding portions of the displayed source code are highlighted.

The system can then receive, through the GUI, one or more adjustments to the displayed source code, e.g., adjustments to machine learning model parameters or functions included in the source code. The system can then generate an updated file representing a machine learning model that is defined by (i) the received user selection of one or more of the multiple user selectable buttons, and (ii) the adjustments to the displayed source code.

In some implementations the system may further store the generated file representing the machine learning model at a location associated with the user. In some implementations the system may receive, through the GUI, a request to publish the generated file representing the machine learning model. In these implementations, the system can publish the generated file as a new asset in the GUI.

It is noted that the optional step of receiving, through the GUI, user selection of the source code button displayed in the GUI and displaying, in the GUI, source code representing the machine learning model that is defined by the received user selection of one or more of the multiple user selectable buttons can be performed as part of processes different to that described in FIG. 5. For example, this optional step can be performed as part of a process for generating a machine learning model using the GUI in standard mode only.

Programming the Hardware: Execution Experience

Figure 6A:
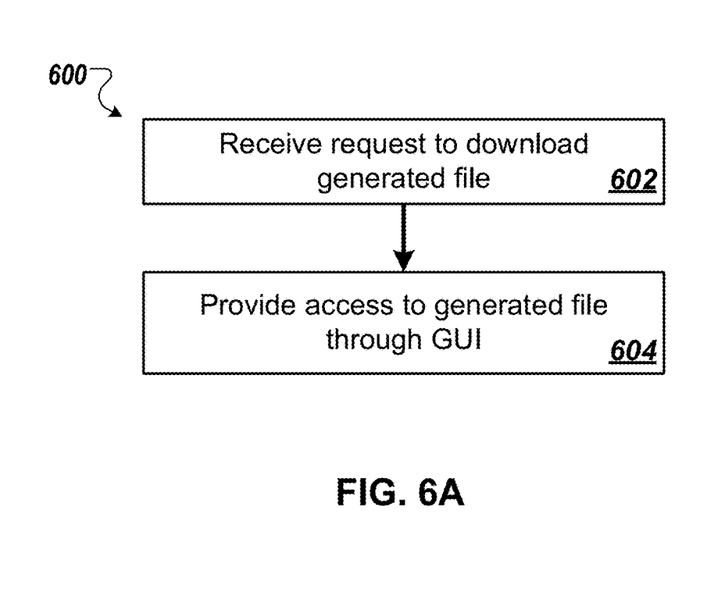
FIGS. 6A and 6B are flow diagrams of example processes for executing a machine learning model that has been generated using a no-coding machine learning pipeline.

FIG. 6A is a flow diagram of a first example process 600 for executing a machine learning model that has been generated using a no-coding machine learning pipeline. For convenience, the process 600 will be described as being performed by a system of one or more computers located in one or more locations. For example, the system 100 of FIG. 1, appropriately programmed in accordance with this specification, can perform the process 600.

After the system generates a file representing a machine learning model, e.g., as described above with reference to step 510 of FIG. 5, the system may further receive, through the GUI used to generate the machine learning model and from the user, a request to download the generated file representing the machine learning model (step 602). In some implementations, e.g., implementations where a user wants to train the machine learning model offline, the generated file may represent an untrained machine learning model. In other implementations, e.g., implementations where a user uploads a training dataset through the GUI to the system or selects a sample dataset provided by the system for training, the user may request that the system trains the machine learning model to generate a file representing a trained machine learning model, and the user may further request to download the generated file representing the trained machine learning model so that inference can be performed offline.

In some implementations the received request to download the generated file may include a request to reformat the generated file according to an indicated type, e.g., a third party flow format. In these implementations the system can generate a reformatted file representing the machine learning model of the indicated type and provide, through the GUI, access to the reformatted file representing the machine learning model.

The system provides, through the GUI, access to the generated file representing the machine learning model (step 604). The user may then provide the generated file to other system components or modules, or to a third party for execution.

The example process 600 decouples the GUI used by the user to generate the machine learning model from the execution process. This can provide increased transparency of execution for the user, as well as increased security since a user need not share their data.

It is noted that the example process 600 can also be performed after the system generates a file representing a machine learning model using a process different to that described in FIG. 5. For example, example process 600 can be performed after the system generates a file representing a machine learning model that has been created by a user operating the example GUI 200 of FIG. 2, i.e., a user operating a GUI in standard mode.

Figure 6B:
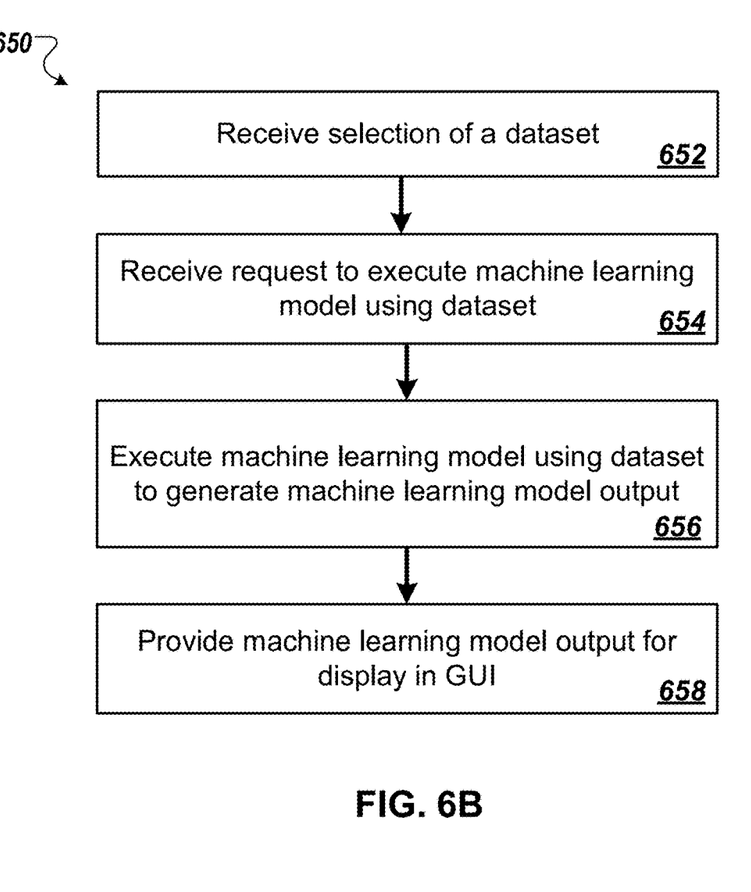

FIG. 6B is a flow diagram of a second example process 650 for executing a machine learning model that has been generated using a no-coding machine learning pipeline. For convenience, the process 650 will be described as being performed by a system of one or more computers located in one or more locations. For example, the system 100 of FIG. 1, appropriately programmed in accordance with this specification, can perform the process 650.

After the system generates a file representing a machine learning model, e.g., as described above with reference to step 510 of FIG. 5, the system receives, through the GUI, selection of a dataset (step 652). For example, the user may select a sample dataset from one of multiple options displayed in the GUI, or may select a dataset imported by the user.

The system receives, through the GUI, a request to execute the generated file representing the machine learning model using the dataset (step 654). Receiving the request to execute the generated file representing the machine learning model using the dataset may include receiving user selection of a run button. In some implementations the system may enable the run button that is displayed in the GUI when a machine learning model input dataset is selected, i.e., after step 652.

The system executes the generated file representing the machine learning model using the dataset to generate a respective machine learning model output (step 656). The generated machine learning model output may include one or more of a trained machine learning model or a solution to a machine learning task that was produced by a trained machine learning model. The system provides the generated machine learning model output for display in the GUI (step 658).

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where a file is mentioned, different file types or formats may be intended, e.g., YAML, HTML, XML, JSON, plain text, or other types of files. Moreover, where a table is mentioned, different data structures (such as spreadsheets, relational databases, or structured files) may be intended.

Thus, particular embodiments have been described. Other embodiments are within the scope of the following claims. For example, the actions recited in the claims may be performed in a different order and still achieve desirable results.

The invention claimed is:

1. A computer implemented method comprising:
   displaying, on a first section of a graphical user interface (GUI), a standard mode graphical representation of a plurality of machine learning sub-routines, the standard mode graphical representation forming a first graph displaying a configuration of one or more connected machine learning sub-routines from the plurality of machine learning sub-routines representative of a corresponding machine learning model;
   displaying, on a second section of the GUI, source code representing the one or more connected machine learning sub-routines of the corresponding machine learning model;
   receiving, at the first section of the GUI, a first user interaction indication associated with a respective one of the one or more connected machine learning sub-routines of the corresponding machine learning model displayed on the first section of the GUI;

in response to receiving the first user interaction indication, highlighting only a portion of the source code displayed on the second section of the GUI corresponding to the respective one of the one or more connected machine learning sub-routines of the corresponding machine learning model displayed on the first section of the GUI, the highlighted portion of the source code not including the entirety of the source code;

receiving, at the second section of the GUI, an adjustment to the source code adjusting a number of neural network layers used by the respective one of the one or more connected machine learning sub-routines;

updating the source code based on the adjustment to the source code;

receiving a second user interaction indication indicating a user selection of a mode button on the GUI;

in response to receiving the second user interaction indication indicating the user selection of the mode button on the GUI:
  generating a wrapped file that conceals the configuration of the one or more connected machine learning sub-routines from a user and represents the same corresponding machine learning model; and
  displaying, on the first section of the GUI, an easy mode graphical representation of the wrapped file, the easy mode graphical representation forming a second graph displaying the wrapped file that conceals the configuration of the one or more connected machine learning sub-routines from the user, the second graph graphically different than the first graph and representing the same corresponding machine learning model as the first graph; and generating, based on the wrapped file and the updated source code, a model file representing the corresponding machine learning model.

2. The method of claim 1, wherein the machine learning sub-routines comprise:
  data formatting algorithms;
  data splitting algorithms;
  feature selection algorithms;
  machine learning training algorithms;
  machine learning evaluation algorithms; or
  statistical algorithms.

3. The method of claim 1, wherein generating the wrapped file comprises wrapping two or more connected machine learning sub-routines from the configuration of the one or more connected machine learning sub-routines together.

4. The method of claim 1, wherein displaying the source code representing the corresponding machine learning model comprises displaying the source code representing the one or more connected machine learning sub-routines of the corresponding machine learning model in response to receiving a third user interaction indication indicating a user selection of a source code button displayed on the GUI.

5. The method of claim 1, wherein the adjustment to the source code further adjusts an activation function used by the respective one of the one or more connected machine learning sub-routines.

6. The method of claim 1, further comprising:
  receiving, through the GUI and from a user, a request to download the generated model file representing the corresponding machine learning model; and
  providing, through the GUI, access to the generated model file representing the corresponding machine learning model.

7. The method of claim 6, wherein the request to download the generated model file representing the corresponding machine learning model comprises a request to reformat the generated model file according to an indicated type, and wherein the method further comprises:
  generating a reformatted model file representing the corresponding machine learning model of the indicated type; and
  providing, through the GUI, access to the reformatted model file representing the corresponding machine learning model.

8. The method of claim 1, further comprising storing the generated model file representing the corresponding machine learning model at a location associated with a user.

9. The method of claim 1, further comprising:
  receiving, through the GUI, selection of a dataset;
  receiving, through the GUI, a request to execute the generated model file representing the corresponding machine learning model using the dataset;
  executing the generated model file representing the corresponding machine learning model using the dataset to generate a respective machine learning model output; and
  displaying, on the GUI, the generated respective machine learning model output.

10. The method of claim 9, wherein receiving selection of the dataset comprises receiving a selection of a sample dataset or receiving selection of a dataset imported by a user.

11. The method of claim 9, wherein receiving, through the GUI, the request to execute the generated model file representing the corresponding machine learning model using the dataset comprises receiving, through the GUI, user selection of a run button, wherein the run button is enabled for selection when a machine learning model input dataset is selected.

12. The method of claim 1, further comprising:
  receiving a request to publish the generated model file representing the corresponding machine learning model; and
  in response to receiving the request, publishing the generated model file as a new asset on the GUI.

13. The method of claim 1, wherein the GUI comprises:
  a drag and drop interface;
  a searchable list of user selectable buttons; and
  an editing area,
  wherein a user can select, drag, and drop user selectable buttons from the searchable list of user selectable buttons into the editing area to define the corresponding machine learning model.

14. The method of claim 13, further comprising displaying, on the GUI, a list of the plurality of machine learning sub-routines in an order based on access frequency.

15. The method of claim 13, wherein the editing area comprises a template graph.

16. The method of claim 1, further comprising displaying, on the GUI, multiple user selectable tabs, comprising a machine learning model creation tab, a machine learning model publish tab, and a machine learning model version tab.

17. A system comprising one or more computers and one or more storage devices storing instructions that are operable, when executed by the one or more computers, to cause the one or more computers to perform operations comprising:

displaying, on a first section of a graphical user interface (GUI), a standard mode graphical representation of a plurality of machine learning sub-routines, the standard mode graphical representation forming a first graph displaying a configuration of one or more connected machine learning sub-routines from the plurality of machine learning sub-routines representative of a corresponding machine learning model;

displaying, on a second section of the GUI, source code representing the one or more connected machine learning sub-routines of the corresponding machine learning model;

receiving, at the first section of the GUI, a first user interaction indication associated with a respective one of the one or more connected machine learning sub-routines of the corresponding machine learning model displayed on the first section of the GUI;

in response to receiving the first user interaction indication, highlighting only a portion of the source code displayed on the second section of the GUI corresponding to the respective one of the one or more connected machine learning sub-routines of the corresponding machine learning model displayed on the first section of the GUI, the highlighted portion of the source code not including the entirety of the source code;

receiving, at the second section of the GUI, an adjustment to the source code adjusting a number of neural network layers used by the respective one of the one or more connected machine learning sub-routines;

updating the source code based on the adjustment to the source code;

receiving a second user interaction indication indicating a user selection of a mode button on the GUI;

in response to receiving the second user interaction indication indicating the user selection of the mode button on the GUI:
  generating a wrapped file that conceals the configuration of the one or more connected machine learning sub-routines from a user and represents the same corresponding machine learning model; and
  displaying, on the first section of the GUI, any easy mode graphical representation of wrapped file, the easy mode graphical representation forming a second graph displaying the wrapped file that conceals the configuration of the one or more connected machine learning sub-routines from the user, the second graph graphically different than the first graph and representing the same corresponding machine learning model as the first graph; and generating, based on the wrapped file and the updated source code, a model file representing the corresponding machine learning model.

18. The system of claim 17, wherein the machine learning sub-routines comprise:
  data formatting algorithms;
  data splitting algorithms;
  feature selection algorithms;
  machine learning training algorithms;
  machine learning evaluation algorithms; or
  statistical algorithms.

19. The system of claim 17, wherein generating the wrapped file comprises wrapping two or more connected machine learning sub-routines from the configuration of the one or more connected machine learning sub-routines together.

20. A non-transitory computer storage medium encoded with instructions that, when executed by one or more computers, cause the one or more computers to perform operations comprising:
  displaying, on a first section of a graphical user interface (GUI), a standard mode graphical representation of a plurality of machine learning sub-routines, the standard mode graphical representation forming a first graph displaying a configuration of one or more connected machine learning sub-routines from the plurality of machine learning sub-routines representative of a corresponding machine learning model;

displaying, on a second section of the GUI, source code representing the one or more connected machine learning sub-routines of the corresponding machine learning model;

receiving, at the first section of the GUI, a first user interaction indication associated with a respective one of the one or more connected machine learning sub-routines of the corresponding machine learning model displayed on the first section of the GUI;

in response to receiving the first user interaction indication, highlighting a portion of the source code displayed on the second section of the GUI corresponding to the respective one of the one or more connected machine learning sub-routines of the corresponding machine learning model displayed on the first section of the GUI, the highlighted portion of the source code not including the entirety of the source code;

receiving, at the second section of the GUI, an adjustment to the source code adjusting a number of neural network layers used by the respective one of the one or more connected machine learning sub-routines;

updating the source code based on the adjustment to the source code;

receiving a second user interaction indication indicating a user selection of a mode button on the GUI;

in response to receiving the second user interaction indication indicating the user selection of the mode button the GUI:
    generating a wrapped file that conceals the configuration of the one or more connected machine learning sub-routines from a user and represents the same corresponding machine learning model; and
    displaying, on the first section of the GUI, an easy mode graphical representation of the wrapped file, the easy mode graphical representation forming a second graph displaying the wrapped file that conceals the configuration of the one or more connected machine learning sub-routines from the user, the second graph graphically different than the first graph and representing the same corresponding machine learning model as the first graph; and generating, based on the wrapped file and the updated source code, a model file representing the corresponding machine learning model.

* * * * *